United States Patent
Buendgen et al.

(10) Patent No.: US 11,354,418 B2
(45) Date of Patent: Jun. 7, 2022

(54) INCREMENTAL DECRYPTION AND INTEGRITY VERIFICATION OF A SECURE OPERATING SYSTEM IMAGE

(71) Applicant: INTERNATIONAL BUSINESS MACHINES CORPORATION, Armonk, NY (US)

(72) Inventors: Reinhard T. Buendgen, Tuebingen (DE); Christian Borntraeger, Stuttgart (DE); Jonathan D. Bradbury, Poughkeepsie, NY (US); Fadi Y. Busaba, Poughkeepsie, NY (US); Lisa C. Heller, Rhinebeck, NY (US); Viktor Mihajlovski, Wildberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 738 days.

(21) Appl. No.: 16/296,334

(22) Filed: Mar. 8, 2019

(65) Prior Publication Data
US 2020/0285753 A1 Sep. 10, 2020

(51) Int. Cl.
G06F 21/57 (2013.01)
G06F 9/4401 (2018.01)
G06F 9/455 (2018.01)

(52) U.S. Cl.
CPC .......... *G06F 21/577* (2013.01); *G06F 9/4406* (2013.01); *G06F 9/45558* (2013.01);
(Continued)

(58) Field of Classification Search
CPC .. G06F 21/577; G06F 9/4406; G06F 9/45558; G06F 21/575; G06F 2009/45575;
(Continued)

(56) References Cited

U.S. PATENT DOCUMENTS

| 4,245,302 A | 1/1981 | Amdahl |
| 6,138,236 A | 10/2000 | Mirov et al. |

(Continued)

FOREIGN PATENT DOCUMENTS

| EP | 3 367 287 A1 | 8/2018 |
| EP | 2577543 B1 | 2/2019 |
| JP | 2011-048661 A | 3/2011 |

OTHER PUBLICATIONS

Petersen, Decentralized Data Verification, Apr. 26, 2018, U.S. Appl. No. 62/663,133 (Year: 2018).*
(Continued)

*Primary Examiner* — Robert B Leung
*Assistant Examiner* — Bruce S Ashley
(74) *Attorney, Agent, or Firm* — Edward Wixted, Esq.; Kevin P. Radigan, Esq.; Heslin Rothenberg Farley & Mesiti P.C.

(57) ABSTRACT

Secure processing within a computing environment is provided by incrementally decrypting a secure operating system image, including receiving, for a page of the secure operating system image, a page address and a tweak value used during encryption of the page. Processing determines that the tweak value has not previously been used during decryption of another page of the secure operating system image, and decrypts memory page content at the page address using an image encryption key and the tweak value to facilitate obtaining a decrypted secure operating system image. Further, integrity of the secure operating system image is verified, and based on verifying integrity of the secure operating system image, execution of the decrypted secure operating system image is started.

15 Claims, 12 Drawing Sheets

(52) U.S. Cl.
CPC .. *G06F 21/575* (2013.01); *G06F 2009/45575* (2013.01); *G06F 2009/45587* (2013.01)

(58) Field of Classification Search
CPC ........... G06F 2009/45587; G06F 21/57; G06F 21/64; H04L 9/0861
See application file for complete search history.

(56) References Cited

U.S. PATENT DOCUMENTS

| | | | |
|---|---|---|---|
| 7,725,559 | B2 | 5/2010 | Landis et al. |
| 7,984,103 | B2 | 7/2011 | Landis et al. |
| 7,984,108 | B2 | 7/2011 | Landis et al. |
| 8,387,114 | B2 | 2/2013 | Sugarbroad |
| 8,639,783 | B1 | 1/2014 | Bakke et al. |
| 8,856,504 | B2 | 10/2014 | Maino et al. |
| 9,086,913 | B2 | 7/2015 | Shanbhogue et al. |
| 9,886,334 | B2 | 2/2018 | Bacher et al. |
| 2011/0302400 | A1 | 12/2011 | Maino et al. |
| 2014/0208109 | A1* | 7/2014 | Narendra Trivedi ... G06F 21/78 713/170 |
| 2016/0216982 | A1 | 7/2016 | Variath et al. |
| 2017/0140153 | A1 | 5/2017 | Zimmer et al. |
| 2018/0247082 | A1* | 8/2018 | Durham ................... G06F 8/63 |
| 2019/0370114 | A1* | 12/2019 | Troia ................... H04L 9/3247 |
| 2020/0057664 | A1* | 2/2020 | Durham ................... H04L 9/32 |
| 2021/0075623 | A1* | 3/2021 | Petersen ............... H04L 9/3247 |

OTHER PUBLICATIONS

Examination Report No. 1 for AU Patent Application No. AU2020-236629, dated Jan. 11, 2022 (2 pages).
Mel et al., "The NIST Definition of Cloud Computing," National Institute of Standards and Technology, Information Technology Laboratory, Special Publication 800-145, Sep. 2011 (pp. 1-7).
International Business Machines Corporation (IBM), "Power ISA™ Version 2.07B," Apr. 9, 2015 (pp. 1-1527).
IBM Publication, "z/Architecture Principles of Operation," IBM® Publication No. SA22-7832-11, 12th Edition, Sep. 2017 (pp. 1-1902).
Manjunath, A.E., "Design of Software Partitioning for X86 Family Processors: HPPAR", International Journal of Software Engineering and Technology Informatics, vol. 01, Issue 01, Jan. 2015 (4 pages).
Boivie et al., "Hardware Support for Malware Defense and End-to-End Trust", International Business Machines Corporation, T.J. Watson Research Center, Yorktown Heights, New York (USA), Feb. 2017 (81 pages).
Mihajlovski et al., "Starting a Secure Guest Using an Initial Program Load Mechanism", U.S. Appl. No. 16/296,304, filed Mar. 8, 2019 (43 pages).
Buendgen et al., "List of IBM Patents and/or Patent Applications Treated as Related", U.S. Appl. No. 16/296,334, filed Mar. 8, 2019, dated Jun. 7, 2019 (2 pages).
International Search Report (ISR) & Written Opinion for International Application No. PCT/EP2020/054101, dated Apr. 6, 2020 (8 pages) (Year: 2020).

* cited by examiner

INCREMENTALLY DECRYPT A SECURE OPERATING SYSTEM IMAGE, INCLUDING FOR A PAGE OF A PLURALITY OF PAGES OF THE SECURE OPERATING SYSTEM IMAGE: ~500

RECEIVE A PAGE ADDRESS OF THE PAGE AND A TWEAK VALUE USED DURING ENCRYPTION OF THE PAGE; ~502

DETERMINE THAT THE TWEAK VALUE HAS NOT PREVIOUSLY BEEN USED DURING DECRYPTION OF ANOTHER PAGE OF THE PLURALITY OF PAGES OF THE SECURE OPERATING SYSTEM IMAGE; AND ~504

DECRYPT MEMORY PAGE CONTENT AT THE PAGE ADDRESS USING AN IMAGE ENCRYPTION KEY USED IN ENCRYPTING THE PAGE AND THE TWEAK VALUE TO FACILITATE OBTAINING A DECRYPTED SECURE OPERATING SYSTEM IMAGE ~506

VERIFY INTEGRITY OF THE SECURE OPERATING SYSTEM IMAGE ~508

BASED ON VERIFYING INTEGRITY OF THE SECURE OPERATING SYSTEM IMAGE, START EXECUTION OF THE DECRYPTED SECURE OPERATING SYSTEM IMAGE ~510

---

THE INCREMENTALLY DECRYPTING AND THE VERIFYING INTEGRITY ARE PERFORMED BY A SECURE INTERFACE CONTROL OF THE COMPUTER SYSTEM, THE SECURE INTERFACE CONTROL BEING A SECURE AND TRUSTED ENTITY OF THE COMPUTER SYSTEM, AND THE PAGE ADDRESS AND THE TWEAK VALUE ARE RECEIVED BY THE SECURE INTERFACE CONTROL FROM A HYPERVISOR ~512

---

PAGE ADDRESSES OF THE PLURALITY OF PAGES ARE IN A FIXED ORDER, e.g., FROM LOW TO HIGH, AND THE INCREMENTALLY DECRYPTING THE SECURE OPERATING SYSTEM IMAGE INCLUDES DETERMINING THAT THE PAGE ADDRESS IS DIFFERENT THAN ANY PREVIOUS PAGE ADDRESS OF PREVIOUSLY DECRYPTED PAGES OF THE PLURALITY OF PAGES OF THE SECURE OPERATING SYSTEM IMAGE ~514

---

THE INCREMENTALLY DECRYPTING THE SECURE OPERATING SYSTEM IMAGE FURTHER INCLUDES DETERMINING THAT THE TWEAK VALUE IS DIFFERENT THAN PREVIOUS TWEAK VALUES USED DURING DECRYPTION OF PREVIOUSLY DECRYPTED PAGES OF THE PLURALITY OF PAGES OF THE SECURE OPERATING SYSTEM IMAGE ~516

---

THE VERIFYING INTEGRITY INCLUDES EMPLOYING, IN PART, A CUMULATIVE CONTENT HASH OBTAINED USING MEMORY PAGE CONTENT OF THE PLURALITY OF PAGES AND A CUMULATIVE ADDRESS HASH OBTAINED USING PAGE ADDRESSES OF THE PLURALITY OF PAGES ~518

FIG. 5A

THE VERIFYING INTEGRITY OF THE SECURE OPERATING SYSTEM IMAGE INCLUDES COMPARING THE CUMULATIVE CONTENT HASH TO AN INTEGRITY CONTENT HASH RECEIVED BY THE SECURE INTERFACE CONTROL FROM THE HYPERVISOR, AND COMPARING THE CUMULATIVE ADDRESS HASH TO AN INTEGRITY ADDRESS HASH RECEIVED BY THE SECURE INTERFACE CONTROL — 520

FURTHER INCLUDING EXTRACTING, BY THE SECURE INTERFACE CONTROL, THE IMAGE ENCRYPTION KEY AND THE INTEGRITY CONTENT HASH AND INTEGRITY ADDRESS HASH FROM METADATA RECEIVED FROM THE HYPERVISOR — 522

THE SECURE INTERFACE CONTROL INCLUDES HARDWARE AND/OR FIRMWARE ELEMENTS OF THE COMPUTER SYSTEM, AND THE SECURE OPERATING SYSTEM IMAGE IS TO BE RUN AS A SECURE GUEST OPERATING SYSTEM WITHIN THE COMPUTING ENVIRONMENT — 524

A PRIVATE-PUBLIC KEY PAIR IS ASSOCIATED WITH THE COMPUTER SYSTEM, THE PRIVATE KEY BEING KNOWN ONLY TO THE SECURE INTERFACE CONTROL, AND NOT ACCESSIBLE BY SOFTWARE RUNNING ON THE COMPUTER SYSTEM, AND WHEREIN THE PUBLIC KEY IS USED BY AN OWNER OF THE SECURE OPERATING SYSTEM IMAGE TO GENERATE KEY AGREEMENT DATA TO SECURELY COMMUNICATE THE IMAGE ENCRYPTION KEY USED FOR ENCRYPTING THE SECURE OPERATING SYSTEM IMAGE WITH THE SECURE INTERFACE CONTROL AND STORE THE KEY AGREEMENT DATA IN A METADATA STRUCTURE — 526

FURTHER INCLUDING RECEIVING BY THE SECURE INTERFACE CONTROL THE METADATA STRUCTURE WITH A CALL FROM THE HYPERVISOR, THE METADATA STRUCTURE FURTHER INCLUDING INTEGRITY HASH VALUES USED IN THE VERIFYING INTEGRITY OF THE SECURE OPERATING SYSTEM IMAGE — 528

FIG. 5B

INCREMENTAL DECRYPTION AND INTEGRITY VERIFICATION OF A SECURE OPERATING SYSTEM IMAGE

BACKGROUND

A guest operating system refers to operating system software installed, for instance, on a virtual machine. In computing, a virtual machine is an emulation of a computer system. Virtual machines, which can be created by a hypervisor, are based on a computer architecture and provide functionality of a physical computer. Their implementations can involve specialized hardware, software, or a combination thereof. Virtualization technology allows a computer to run more than a single operating system at a time.

In current computing environments, system software, such as the operating system, must be trusted, because it has complete control over the application to be executed and the data. Traditionally, the operating system (as well as the hypervisor) can access or modify the data of any application, or potentially tamper with a security feature implemented by the application without being detected. Consequently, the underlying software should be part of a trusted computing base.

In shared environments, application customers are forced to trust that the entities that develop, configure, deploy, and control the system software are not malicious. Customer applications must also trust that the system software is invulnerable to attacks that escalate privilege and compromise the integrity of the application information. This broad trust requirement can sometimes be difficult to justify, and possesses significant risk, especially for application customers who adopt, for instance, public cloud services.

SUMMARY

Certain shortcomings of the prior art are overcome, and additional advantages are provided through the provision of a computer system to facilitate secure processing within a computing environment. The computer system includes a memory, and a processor coupled to the memory, and the computer system is configured to perform a method. The method includes incrementally decrypting a secure operating system image. The incrementally decrypting includes, for a page of a plurality of pages of the secure operating system image: receiving a page address of the page and a tweak value used during encryption of the page; determining that the tweak value has not previously been used during decryption of another page of the plurality of pages of the secure operating system image; and decrypting memory page content at the page address using an image encryption key and the tweak value to facilitate obtaining a decrypted secure operating system image. The method also includes verifying integrity of the secure operating system image, and based on verifying integrity of the secure operating system image, starting execution of the decrypted secure operating system image. Advantageously, incremental decryption of the pages of a secure operating system image, where the pages are separately encrypted using an image encryption key and a unique tweak value (also referred to as an initialization vector), provides enhanced security within the computing environment by, for instance, preventing statistical analysis of the secure operating system image to obtain meaningful data. Further, the summarized approach also allows data stored in different locations to be encrypted differently.

In one or more embodiments, the incrementally decrypting and the verifying integrity are performed by a secure interface control of the computer system. The secure interface control is a secure and trusted entity of the computer system, and the page address and tweak value are received by the secure interface control from a hypervisor. Advantageously, the secure interface control presents a secure execution environment, where the memory of a guest operating system and its applications running in secure virtual machines are protected from the hypervisor, as well as other virtual machines and any programs that are running on the same host system as the virtual machine(s).

In one or more embodiments, page addresses of the plurality of pages are in a fixed order (for instance, from low-to-high), and the incrementally decrypting the secure operating system image includes determining that the page address is different (e.g., larger in the case where the ordering is from low-to-high) than any previous page address of previously decrypted pages of the plurality of pages of the secure operating system image. Further, in one or more implementations, the incrementally decrypting the secure operating system image further includes determining that the tweak value is different (e.g., larger in the case of low-to-high ordering) than any previous tweak values used during decryption of previously decrypted pages of the plurality of pages of the secure operating system image.

In one embodiment, the verifying integrity includes employing, in part, a cumulative content hash obtained using memory page content of the plurality of pages and a cumulative address hash obtained using page addresses of the plurality of pages. For instance, the verifying integrity of the secure operating system image can include comparing the cumulative content hash to an integrity content hash received by the secure interface control with metadata from the hypervisor, and comparing the cumulative address hash to an integrity address hash received by the secure interface control with the metadata from the hypervisor. For instance, the secure interface control can extract the integrity content hash and integrity address hash, as well as the image encryption key, from the metadata received from the hypervisor. Advantageously, the secure interface control, that is, a secure entity of the host system, is able to verify integrity of the operating system image in order to prevent execution of an image that has been tampered with. For this purpose, the hash value computed from the content of the memory pages, as well as the hash value from the list of memory page addresses of the operating system image are used and compared against respective integrity hash values of content and addresses that have been provided in the order of the page addresses. Note, in this regard, that ordering page addresses from low to high facilitates both tweak validity and integrity checking. Note also that memory pages do not need to be contiguous using the above-noted processes.

In one or more embodiments, the secure interface control includes firmware elements of the computer system, and the secure operating system image is to be run as a secure guest operating system image within the computing environment. In one or more specific embodiments, a private-public key pair is associated with the computer system, with the private key being known only to the secure interface control, and not accessible to software running on the computer system. The public key is used by an owner of the secure operating system image to generate key agreement data to securely communicate the image encryption key used for encrypting the secure operating system image with the secure interface control and store the key agreement data in a metadata structure. The metadata structure can be received by the secure interface control with a call from the hypervisor. The metadata structure can further include integrity hash values used in the verifying integrity of the secure operating system image. Advantageously, this process results in a secure execution environment, where confidentiality of the secure operating system image is preserved, and integrity of the operating system is verified at the same time. In this process, the secret key, that is, the image encryption key, is chosen by the owner of the secure operating system image, and all components of the operating system are assumed to be encrypted, as well as data at rest used by the operating system image after it has been booted.

Computer program products and computer-implemented methods relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A-5B depict one example of incremental decryption and integrity verification of a secure operating system image, in accordance with one or more aspects of the present invention;

DETAILED DESCRIPTION

In accordance with an aspect of the present invention, a capability is provided to facilitate secure processing within a computing environment. In one example, the capability includes incrementally decrypting a secure operating system image page-by-page, where each page is assumed to have been encrypted using an image encryption key, that is, a secret key, and a respective unique tweak value. The incrementally decrypting includes determining that the unique tweak value for a particular page has not been previously used during decryption of another page of the secure operating system image. Additionally, integrity verification of the secure operating system image is performed commensurate with decrypting of the encrypted pages of the image. Further, based on verifying integrity of the secure operating system image, execution of the image is started.

Figure 1:
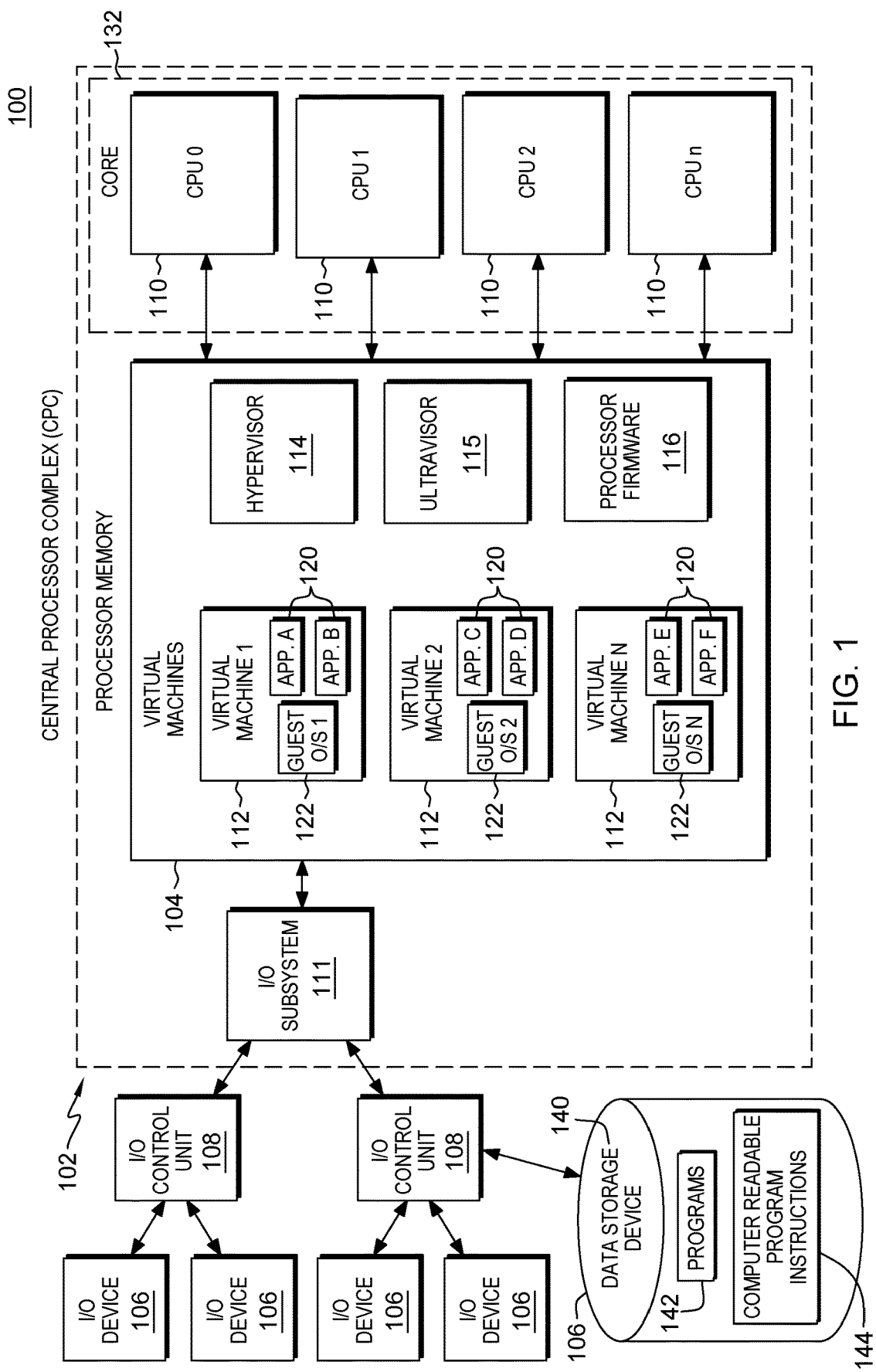
FIG. 1 depicts one example of a computing environment to incorporate and use one or more aspects of secure operating system image decryption and integrity verification, in accordance with one or more aspects of the present invention.

One example of a computing environment to incorporate and use one or more aspects of an incremental decryption and integrity verification process such as disclosed herein is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture Principles of Operation," IBM® Publication No. SA22-7832-11, 12th Edition, September 2017, which is hereby incorporated herein by reference in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114 that manages the virtual machines, an ultravisor 115 (or secure interface control), and processor firmware 116. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. In one or more embodiments, the secure interface control (ultravisor 115) can be implemented, at least in part, in hardware and/or firmware configured to perform, for instance, processes such as described herein.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine.

Additionally, in one embodiment, each CPU 110 is a hardware thread executing within a processing core (a.k.a., core) 132. A core includes one or more threads, and in this example, core 132 includes four hardware threads. In other examples, the computing environment may include one or more cores, and each core may include one or more hardware threads.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In one particular example, the model of virtual machines is a V=V model, in which the real or absolute memory of a virtual machine is backed by host virtual memory, instead of real or absolute memory. Each virtual machine has a contiguous virtual memory space. The physical resources are managed by hypervisor host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

As noted, memory 104 is coupled to I/O subsystem 111. I/O subsystem 111 may be a part of the central processing complex or separate therefrom. It can direct the flow of information between main storage 104 and input/output control units 108 and input/output (I/O) devices 106 coupled to the central processing complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Computer readable program instructions configured to carry out functions of embodiments of aspects of the invention can also or alternatively be included in memory 104. Many variations are possible.

As disclosed herein, the memory of a guest operating system and its applications running in a secure virtual machine(s) are protected from an untrusted hypervisor, as well as from other virtual machines and any programs that are running on the same host system as the virtual machine. The protection is enforced by a trusted entity, including hardware and/or firmware elements of a secure host system. The trusted entity is referred to herein as a secure interface control or ultravisor. In one or more implementations, the secure interface control (or ultravisor) runs in trusted firmware. The trusted firmware resides in Hardware System Area (HSA), which is highly protected and can only be accessed by the lowest levels of firmware. This code is owned, in one or more embodiments, by the manufacturer of the computer system, and shipped by the manufacturer, being securely maintained by the manufacturer. The contents of this code are read by the machine to execute the code, but are not dumped or extracted from the machine. The secure interface control is, in one or more embodiments, an extension of the hardware used to implement instructions which may be too complicated to be implemented purely in hardware. In contrast, the hypervisor can refer to any software that can host multiple guests (a/k/a, virtual machines). The hypervisor need not belong to the system firmware that is loaded with care, and protected from access by the software running on the system. In general, the hypervisor can be, in one or more embodiments, third party software, with broad management interfaces, including network interfaces. The hypervisor is thus untrusted, and may be subject to vulnerabilities exploitable through a network interface, or to malicious or negligent management.

An operating system image intended to run as a secure guest in a computing environment is assumed herein to be protected against inspection and tampering, even before it is made available to the host system in order to ensure confidentially and integrity. To accomplish this, the operating system image is encrypted and integrity-protected by a secret key chosen by the owner of the image. The secret key is also referred to herein as the image encryption key. All components of the operating system image are assumed to be encrypted as well as all data at rest used by the operating system after the system has been booted.

Encryption of data not required to boot the operating system can be done independent of the encryption of the operating system image itself. The decryption of the additional data can be done by the operating system running as a secure guest. For instance, an encrypted Linux operating system image can contain a kernel, an initial ramdisk and a kernel parameter line. The initial ramdisk can contain the secret key that is used to decrypt the data residing on an encrypted disk volume assigned to the virtual machine.

The host system running the virtual machine needs to be able to decrypt the secure operating system image in order to boot it. To ensure confidentiality, this capability is reserved herein to trusted hardware and firmware of the host system (the "secure interface control" or "ultravisor"). For this purpose, a private-public key pair is associated with the host system. The private key is only known to the trusted hardware and firmware of the host system (i.e., the secure interface control or ultravisor) and not accessible by any software running on the host. The public key is used by the owner of the encrypted operating system image to generate key agreement data to securely communicate the image encryption key used for encrypting the secure operating system image with the secure interface control and store the key agreement data in a metadata structure (referred to herein as a Secure Execution (SE) Header). By way of example, RSA key wrapping or Diffie-Hellman/KEM-type key exchange methods can be used. The SE Header's size is independent of the size of the operating system image.

Further, as disclosed herein, the host system also verifies the integrity of the operating system image in order to prevent the execution of an image that has been tampered with. For this purpose an integrity hash value is computed for the content of the memory pages, as well as an integrity hash value for the list of memory page addresses of the operating system image. In one or more embodiments, to facilitate computation of both hash values, the pages and their addresses are provided in the order of the page addresses, e.g., from lowest to highest. These integrity hash values to be compared against can be stored in and provided to the secure interface control or ultravisor via the metadata structure (SE Header).

The process of incrementally decrypting and facilitating integrity checking of the secure operating system image is referred to herein as unpacking. One or more aspects disclosed herein cover a process within the secure host system decrypts the operating system image in a manner to preserve confidentiality and verify the integrity of the operating system image at the same time. In one or more embodiments, this can be facilitated by enforcing the order of memory pages during the unpacking process. Another advantage of the inventive aspects described herein is the capability of handling non-contiguously-saved operating system images.

Additionally, in one or more aspects, the decrypting and verifying integrity of the secure operating system image approach disclosed makes statistical analysis of the secure operating system image and attacks on the image based on statistical analysis thereof harder to accomplish.

As noted, in one or more embodiments, specially-prepared, secure operating system images are executed herein in a manner that will not allow the observation of the memory contents in the secure state. To have intrinsic security, the operating system image is assumed to be encrypted with a key, referred to herein as the secret key or image encryption key, chosen by a user or owner of the secure operating system image. After encryption is done, the encryption key, that is, the image encryption key, is wrapped with a second, public key of a public-private key pair, or with a symmetric key derived from a public-private key pair, of the host computing system. In one or more embodiments, the page-by-page encrypting can be via a symmetric key algorithm that uses, for instance, an initialization vector, referred to herein as a tweak value, with the tweak value being unique for each page of the image.

Figure 2:
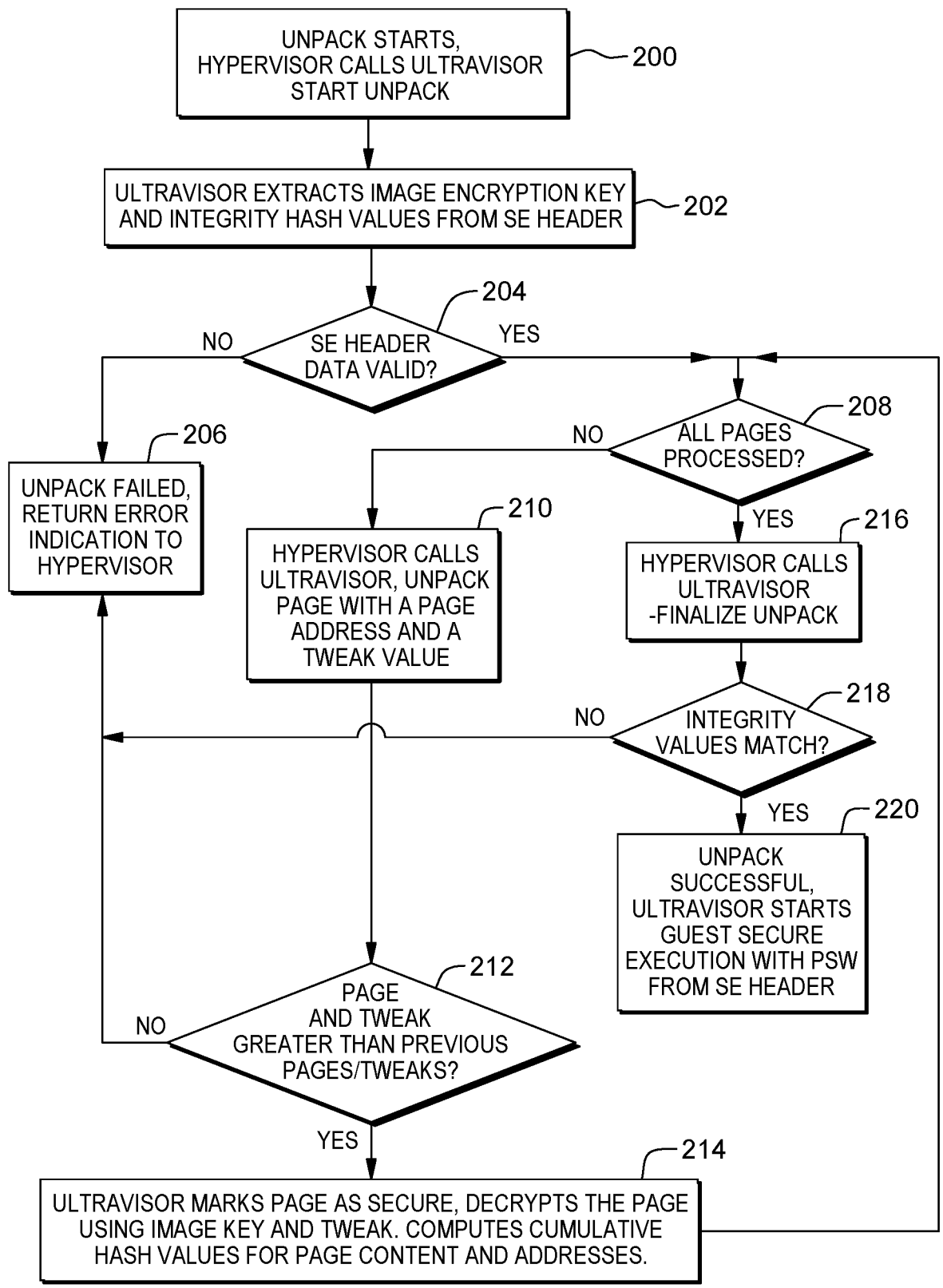
FIG. 2 depicts one embodiment of a process of incremental decryption and integrity verification of a secure operating system image, in accordance with one or more aspects of the present invention.

FIG. 2 depicts one embodiment of unpack processing, in accordance with one or more aspects. In one or more embodiments, the ultravisor or secure interface control offers functionality, accessible to the hypervisor, via ultravisor calls, including a start unpack operation call, a perform page-by-page unpack operation call, and a complete unpack operation call. Before the ultravisor can be called, the encrypted, secure operating system image is loaded into virtual machine (VM) memory, which is still insecure, to allow the hypervisor to perform the loading. Further, the hypervisor must know the addresses of all pages constituting the operating system image, and also the tweaks used for the encryption of each page. It is not important for aspects of the present invention how this information is made available to the hypervisor. For simplicity, an unencrypted bootstrap component can be loaded into virtual machine memory, along with the encrypted image. This component can be used to call the hypervisor with the following parameters: SE header, a list of memory page addresses and a list of tweaks (e.g., one tweak-per-page address).

Instead of providing comprehensive page lists to the hypervisor, it is also possible to specify a list of page ranges to save memory. Similarly, rather than providing a list of tweaks, it is possible to specify ranges of tweaks where subsequent teaks differ by a fixed positive value. Alternatively, tweak values could be derived from the page addresses. Neither of the above options have an influence on the interaction between the hypervisor and the ultravisor. The hypervisor starts the unpack operation by a call to the ultravisor, for instance, "start unpack", with the SE header as a parameter 200. The SE header contains the owner's image encryption key wrapped by the public host key and the image integrity hash values for the image page content and page addresses. The ultravisor extracts the image encryption key and the integrity values from the SE header 202, and determines whether the SE header data is valid 204. If "no", then the unpack operation has failed, and a disabled wait state is entered 206. The disabled wait state is entered so that the guest operating system cannot run, that is, there the guest is unable to leave the disabled wait state. For instance, an error can be returned to the hypervisor. In one or more embodiments, the guest system can be reset, in which case it would start again with the loading of the encrypted image, and start the unpacking process described above. Alternatively, the guest system could be powered off, which would effectively remove the virtual machine, that is, release the host resources used by that virtual machine.

The hypervisor loops over all page addresses of the specified memory regions, ordered from low-to-high page addresses (in one or more embodiments) 208, and calls the ultravisor "unpack page" operation with a page address and tweak used for the encryption of this page 210. The ultravisor then performs the following operations. The ultravisor will set the memory page to secure, and decrypt the memory page content using the image encryption key from the SE header and the tweak value that was used to encrypt the page. To prevent a tweak value from being used more than once, each new tweak should be representative by a number larger than a previously used tweak, and each page address should be greater than a previously used page address 212. If "no", then the unpack has failed, and disabled wait state is entered 206. Otherwise, the ultravisor marks the page as secure, decrypts the page using the image encryption key and tweak, and determines a cumulative content hash for page content, and a cumulative address hash for page addresses 214. (For instance, computation of the cumulative hash can be: cum_hash: =cum_hash+partial hash (page i) over all pages, where $1<=i<=n$, and + is a complicated operation.) The ultravisor determines, in one embodiment, a running hash value from the content of the memory page and a summary value of all previously decrypted pages, and another hash value from the page address of the memory page and a summary value of page addresses of all previously decrypted pages. An enhancement over a page-by-page address hash computation such as noted above could be achieved by concatenating multiple page addresses into a memory page, and then calculating the hash value over that memory page.

After all operating system image pages have been processed 208, the hypervisor calls the ultravisor with a "finalize unpack" operation 216, where the ultravisor compares the computed content and address hash values for the content and the page addresses with the respective integrity hash values contained in the SE header 218. If they do not match, then the unpack operation failed, and an error indication is returned to the hypervisor 206. Otherwise, the unpack operation has been successful, and the ultravisor can start secure guest execution with a program status word (PSW) from the SE header, which starts the operating system image running in secure mode.

Note that with the processing described herein, memory pages do not need to be contiguous, as the image may have "holes", but the decryption process should (in one or more embodiments) take place in a low-to-high order, to allow both the tweak validity and integrity checking described herein. Pages belonging to the guest but not unpacked during guest initialization will be secure and zeroed out on a first access by the secure guest.

Figure 3A:
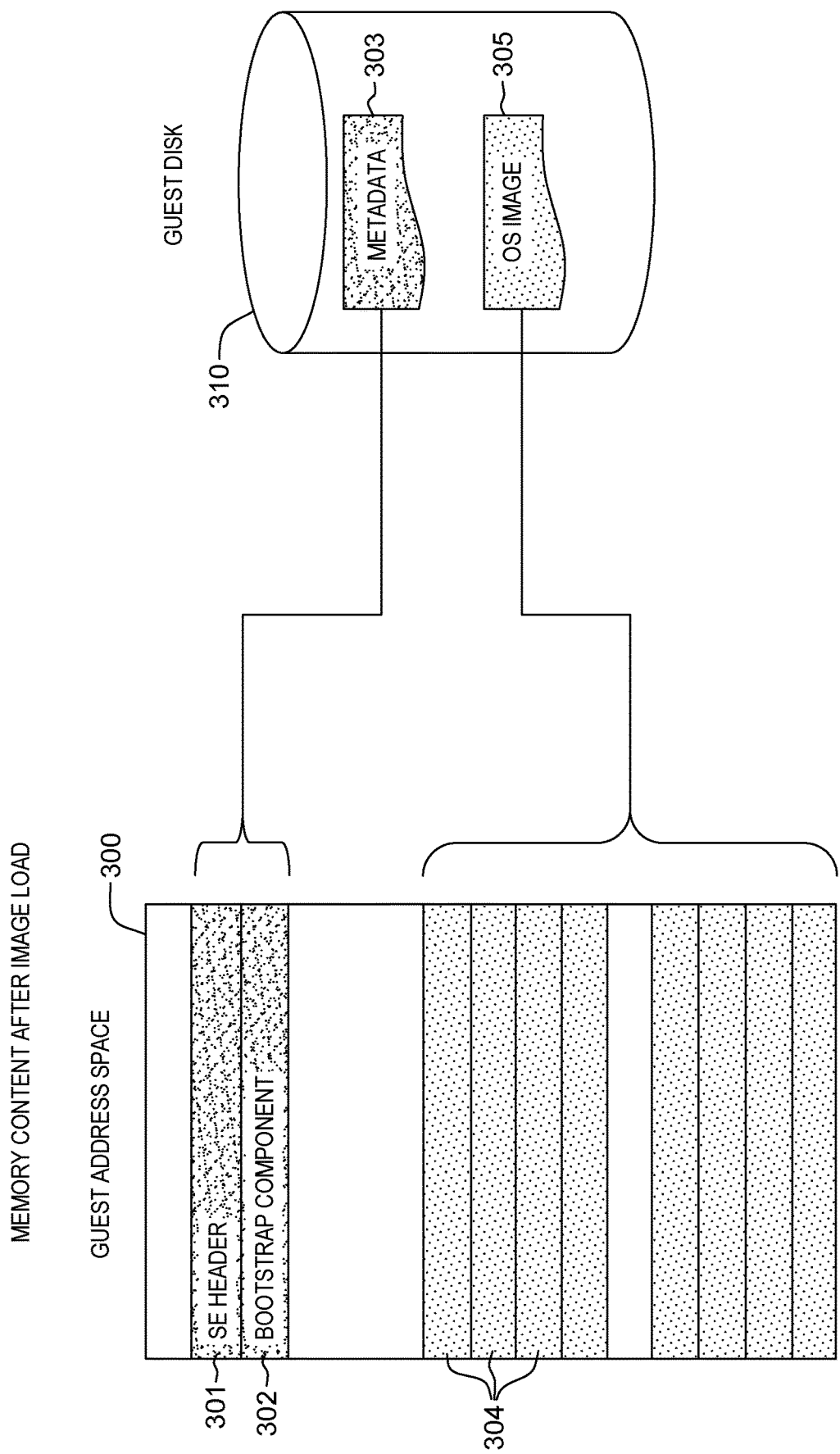
FIG. 3A depicts one embodiment of virtual machine (VM) memory content after a secure operating system image load, in accordance with one or more aspects of the present invention.

By way of further example, FIG. 3A depicts one embodiment of memory content after secure operating system image load. As noted, in one or more embodiments, the secure operating system image is assumed to be encrypted with an image encryption key by a user or owner of the secure operating system image. This image encryption key is a secret key chosen by the user or owner. After the encryption is complete, the encryption key is wrapped with a public key of, or with a symmetric key derived from, a public-private key pair of the host computing system and stored in a metadata structure (i.e., secure execution (SE) header) 301, which is provided within guest address space 300 as part of metadata 303 from guest disk 310. The guest disk 310 and guest address space 300 are (in one or more embodiments) memory provided by the hypervisor to the virtual machine to run the secure operating system image. Along with the SE header 301, a bootstrap component 302 can be provided to initiate execution of the secure operating system image. In one or more implementations, this metadata 303 is unencrypted, but protected against being tampered with. The secure operating system image 305 includes address pages 304 which, as noted above, have been individually encrypted using the owner's image encryption key to ensure that the operating system image is protected. The secure operating system image can be loaded into the memory (as depicted in FIG. 3A) via the hypervisor.

Figure 3B:
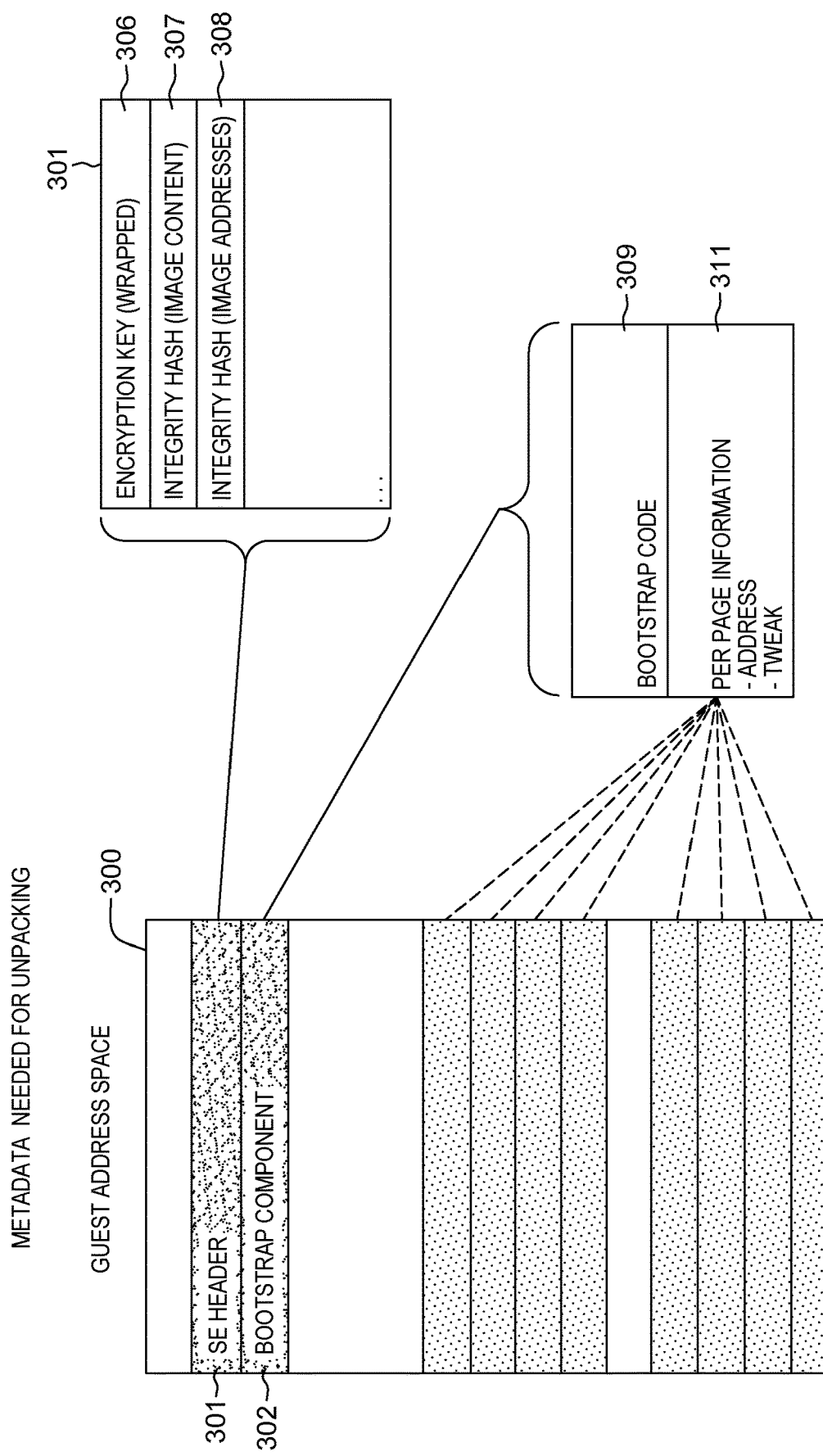
FIG. 3B depicts one embodiment of metadata used for unpacking of a secure operating system image pursuant to an incremental decryption and integrity verification process, in accordance with one or more aspects of the present invention.

FIG. 3B further depicts metadata used, in one or more embodiments, for unpacking the secure operating system image. As illustrated, the SE header 301 within guest address space 300 can include the image encryption key (wrapped with a public key) 306, as well as an integrity hash of the image content 307 and an integrity hash of the image addresses 308. Bootstrap component 302 can include, in one or more embodiments, bootstrap code 309, which can be, or include, a piece of code executable by the hypervisor, as well as per-page information 311, including page addresses and tweak values. As noted, in one or more embodiments, page addresses can be sent to the ultravisor by the hypervisor are ordered, such as in ascending or descending order, as an efficient approach to being able to evaluate that the page address and tweak value are different from previous page addresses and tweak values of the secure operating system image. By way of example only, the page address are described in one or more embodiments herein as being arranged in ascending order, such as in the example of FIGS. 4A-4C below. As described herein, the metadata containing the page and tweak lists can be produced by an entity, such as, a software tool, and this entity and the hypervisor will have a common understanding of the ordering of the addresses and tweaks within the list. More particularly, in one or more implementations, the order that matters is the order in which the pages are encrypted and hashed, and the order in which the hypervisor presents the pages to the ultravisor, with these orders matching. The order may be, as noted, either ascending or descending, but the ultravisor needs to know which direction was used when generating the image. The direction will therefore typically be prescribed by the secure interface control (or ultravisor) architecture.

Figure 4A:
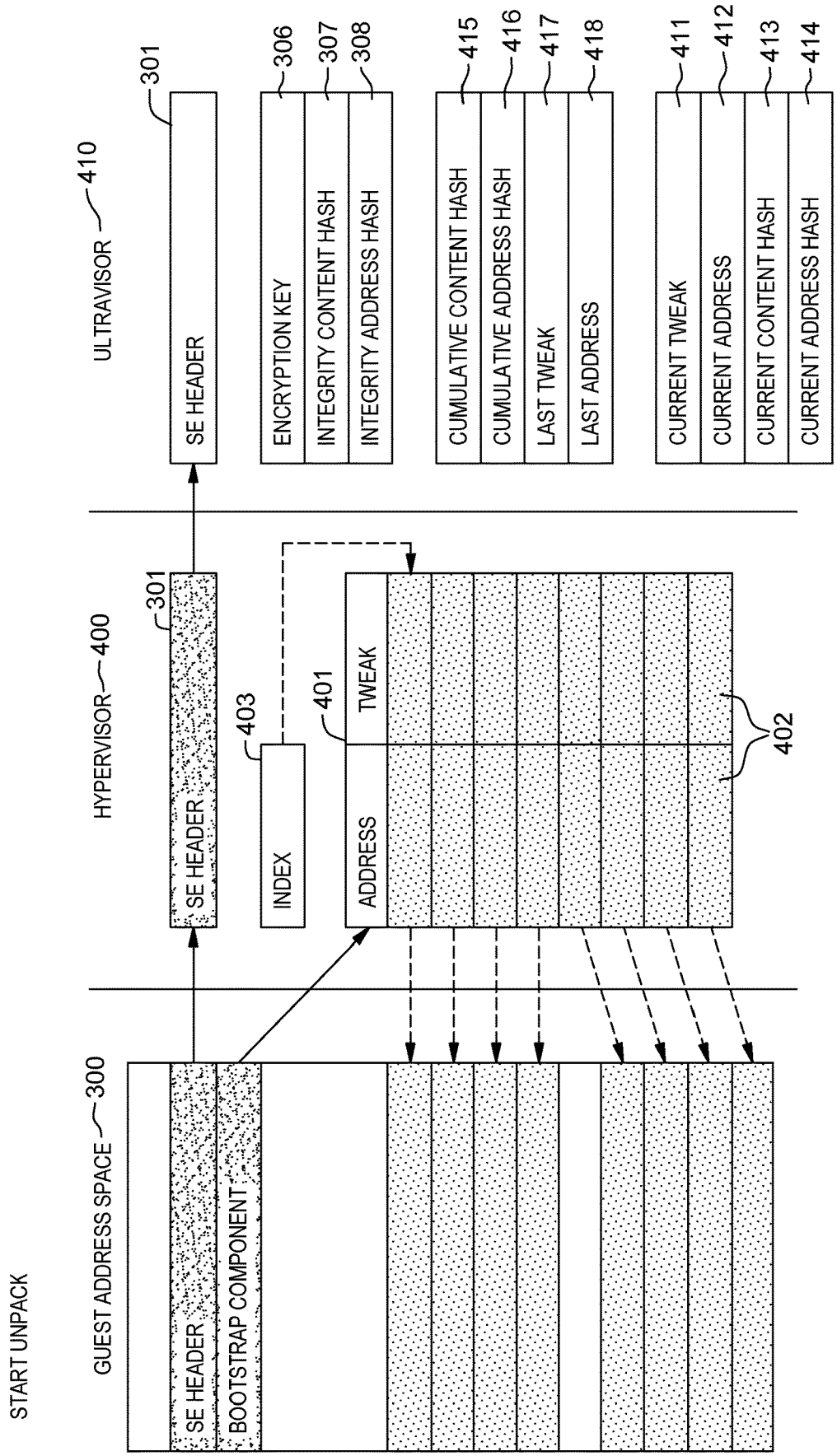
FIG. 4A depicts one embodiment of a start image unpacking process, showing data structures and operations of a guest address space, hypervisor and ultravisor (or secure interface control) pursuant to an incremental decryption and integrity verification process, in accordance with one or more aspects of the present invention.
Figure 4B:
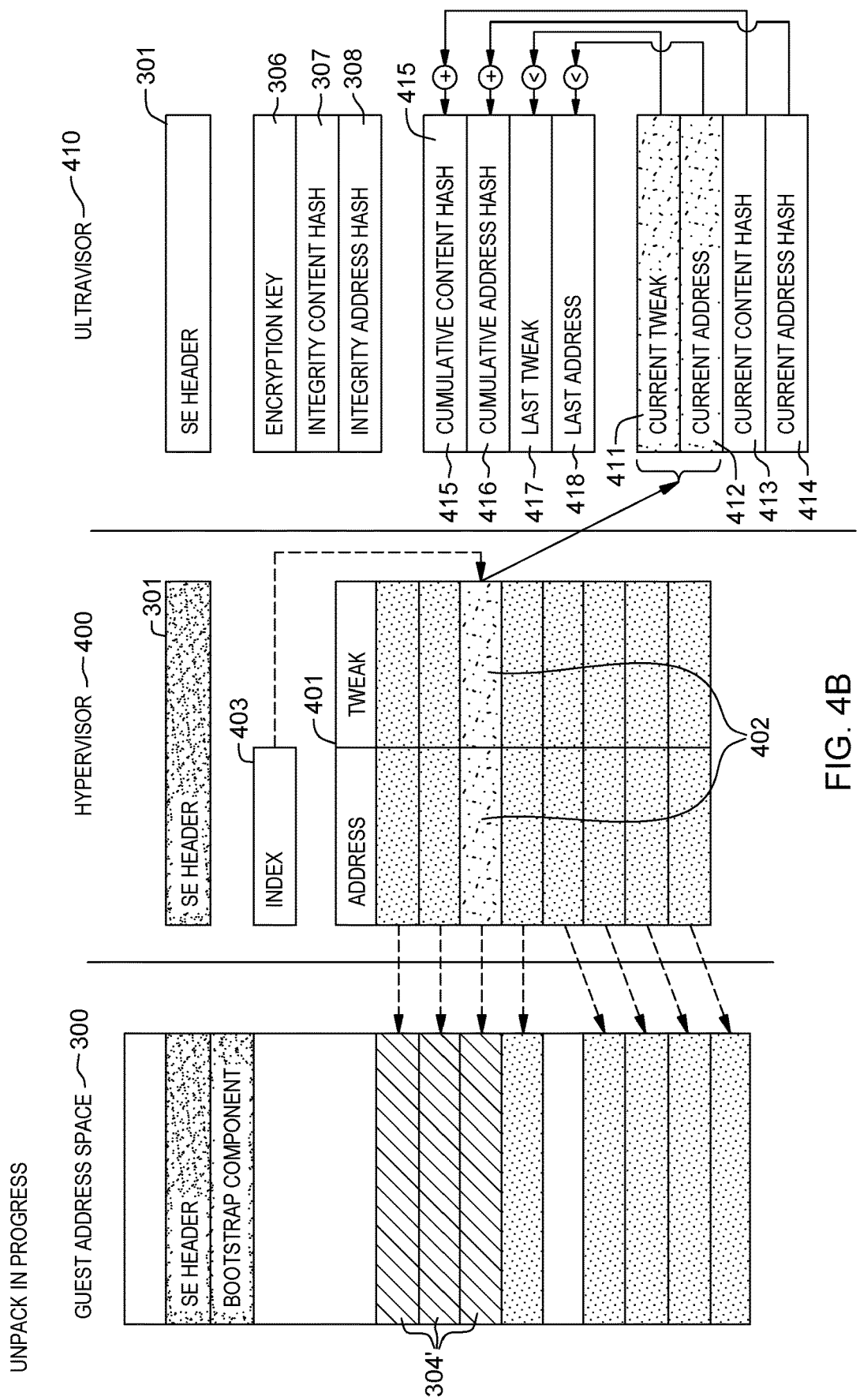
FIG. 4B depicts further details of one embodiment of an unpacking process between the guest address space, hypervisor, and ultravisor of FIG. 4A, in accordance with one or more aspects of the present invention.
Figure 4C:
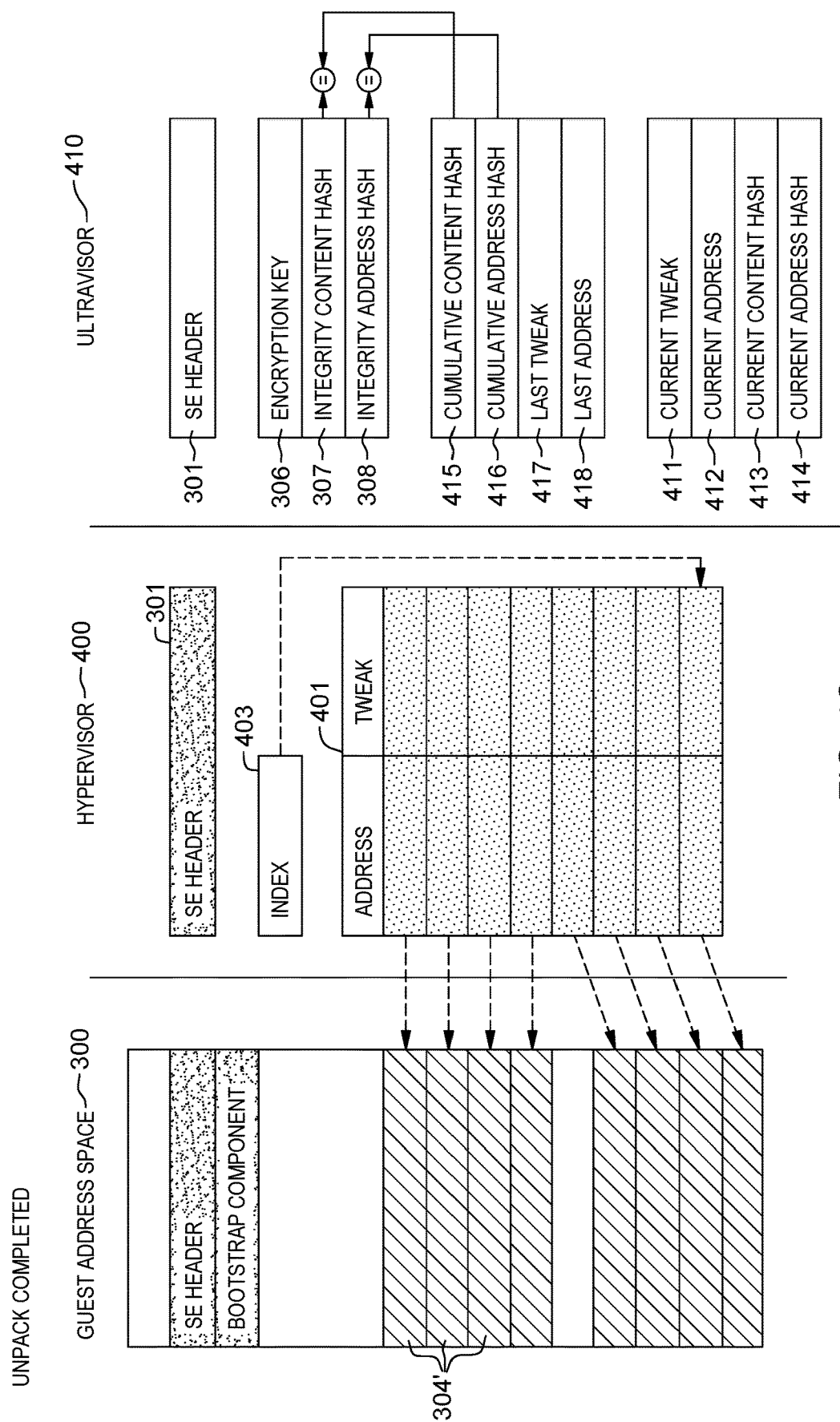
FIG. 4C depicts one embodiment of the guest address space, hypervisor, and ultravisor of FIGS. 4A & 4B upon completion of operating system image unpacking, in accordance with one or more aspects of the present invention.

FIGS. 4A-4C depict one embodiment of the unpacking process, showing data structures and/or operations of the hypervisor and ultravisor, pursuant to an incremental decryption and integrity verification process, in accordance with one or more aspects of the present invention.

In FIG. 4A, relevant data structures of the guest address space 300, hypervisor 400, and ultravisor 410 are depicted. As shown, a call is made to hypervisor 400 to run a secure operating system image. Hypervisor 400 receives the SE header 301, and temporarily stores the header for forwarding to ultravisor 410. Ultravisor 410 is called by the hypervisor to start the unpack process, and the ultravisor extracts and places within its protected memory (e.g., registers) the image encryption key 306, integrity content hash 307, and integrity address hash 308 from the SE header. As illustrated, ultravisor 410 also maintains, in one or more embodiments, registers with a current tweak value 411, a current address of the page to be decrypted 412, a current content hash 413, and a current address hash 414, as well as a cumulative content hash 415, cumulative address hash 416, last tweak value 417, and last page address 418.

By way of example, cumulative content hash 415 includes a hash value over the content of the memory pages that have been decrypted by the ultravisor so far, cumulative address hash 416 contains a hash value over the addresses of the memory pages that have been decrypted so far, last tweak value 417 and last address 418 will contain the tweak and address values last seen by the ultravisor, which in one or more embodiments disclosed herein, allow the ultravisor to ensure that page addresses and tweak values are not reused. The tweak value, current address, current content hash and current address hash are working registers and refer to the page that is currently being processed by ultravisor 410.

Hypervisor 400 regains control and constructs a data structure 401 which includes, in one or more embodiments, a page address and tweak value pair 402 for each page address of the secure operating system image. An index 403 is provided by the hypervisor 400 that is used to iterate over the memory pages of the image.

FIG. 4B depicts the guess address space, hypervisor and ultravisor structures and processing of FIG. 4A, with an unpack operation in process, where page address tweak value pair 402 has been provided by hypervisor 400 to ultravisor 410. This current pair has been placed into the current address and current tweak registers, and a comparison is shown being made to ensure that the current address is greater than the last address, and the current tweak is greater than the last tweak. Further, as part of the decryption of the particular page content in guest address space, the current content hash and current address hash can be added to the cumulative content hash and cumulative address hash being maintained by ultravisor 410. As illustrated in FIG.

4B, certain pages have been decrypted 304'. After decryption, these pages are, in one or more embodiments, protected by ultravisor 410 millicode, so hypervisor 400 cannot access the protected pages once decrypted. Ultravisor 410 could use, for instance, a storage key facility, to ensure that the hypervisor does not have access to the unencrypted pages of the secure operating system image.

FIG. 4C depicts the data structures and processes of FIGS. 4A & 4B after all memory pages of the secure operating system image have been decrypted by the ultravisor (as well as protected by the ultravisor). Hypervisor 400 makes a final unpack call to the ultravisor to verify integrity of the secure operating system image employing the cumulative content hash 415 and cumulative address hash 416. As illustrated, the ultravisor is called to compare the integrity content hash received with the SE header to the cumulative content hash ascertained, as well as to compare the integrity address hash of the SE header and the cumulative address hash obtained. Assuming that the respective comparisons are true, that is, that the cumulative content hash equals the integrity content hash, and that the cumulative address hash equals the integrity address hash, integrity of the secure operating system image is confirmed, and the ultravisor can start execution of the decrypted secure operating system image using, for instance, a program status word (PSW) from the SE header.

Further details of one embodiment of facilitating secure processing within a computing environment, as it relates to one or more aspects of the present invention, are described with reference to FIGS. 5A & 5B.

Referring to FIG. 5A, in one embodiment, a secure operating system image is incrementally decrypted (500), which includes for a page of a plurality of pages of the secure operating system image: receiving a page address of the page and a tweak value used during encryption of the page (502); determining that the tweak value has not previously been used during decryption of another page of the plurality of pages of the secure operating system image (504); and decrypting memory page content at the page address using an image encryption key used in encrypting the page and the tweak value to facilitate obtaining a decrypted secure operating system image (506). Further, integrity of the secure operating system image is verified (508), and based on verifying integrity of the secure operating system image, execution of the decrypted secure operating system image is started (510).

In one or more embodiments, the incrementally decrypting and the verifying integrity are performed by a secure interface control of the computer system, where the secure interface control is a trusted entity of the computer system, and the page address and the tweak value are received by the secure interface control from a hypervisor (512). Further, in one embodiment, page addresses of the plurality of page addresses are in a fixed order (e.g., from low-to-high), and the incrementally decrypting the secure operating system image includes determining that the page address is different than any previous page address of previously decrypted pages of the plurality of pages of the secure operating system image (514).

In one or more implementations, the incrementally decrypting the secure operating system image further includes determining that the tweak value is different than any previous tweak values used during decryption of previously decrypted pages of the plurality of pages of the secure operating system image (516).

By way of further example, the verifying integrity can include employing, in part, a cumulative content hash obtained using memory page content of the plurality of pages and a cumulative address hash obtained using page addresses of the plurality of pages (518). For instance, as shown in FIG. 5B, the verifying integrity of the secure operating system image can include comparing the cumulative content hash to an integrity content hash received by the secure interface control from the hypervisor, and comparing the cumulative address hash to an integrity address hash received by the secure interface control from the hypervisor (520).

In one or more embodiments, the process includes extracting, by the secure interface control, the image encryption key and the integrity content hash and integrity address hash from metadata received from the hypervisor (522). In a specific example, the secure interface control includes firmware elements of the computer system, and the secure operating system is to be run as a secure guest operating system within the computing environment (524). By way of example, a private-public key pair can be associated with the computer system, with the private key being known only to the secure interface control, and not accessible by software running on the computer system, and where the public key is used by an owner of the secure operating system image to wrap the image encryption key used for encrypting the secure operating system image, and to store the wrapped image encryption key in a metadata structure forwarded to the secure interface control (526). Further, the secure interface control can receive the metadata structure with a call from the hypervisor, with the metadata structure further including integrity hash values used in the verifying integrity of the secure operating system image (528).

Other variations and embodiments are possible.

Figure 6A:
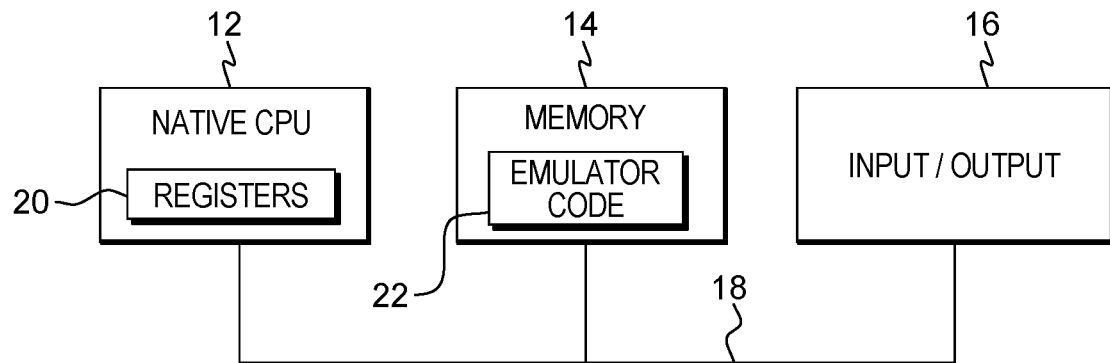
FIG. 6A depicts another example of a computing environment to incorporate or use one or more aspects of the present invention.

Aspects of the present invention may be used by many types of computing environments. Another embodiment of a computing environment to incorporate and use one or more aspects of the present invention is described with reference to FIG. 6A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
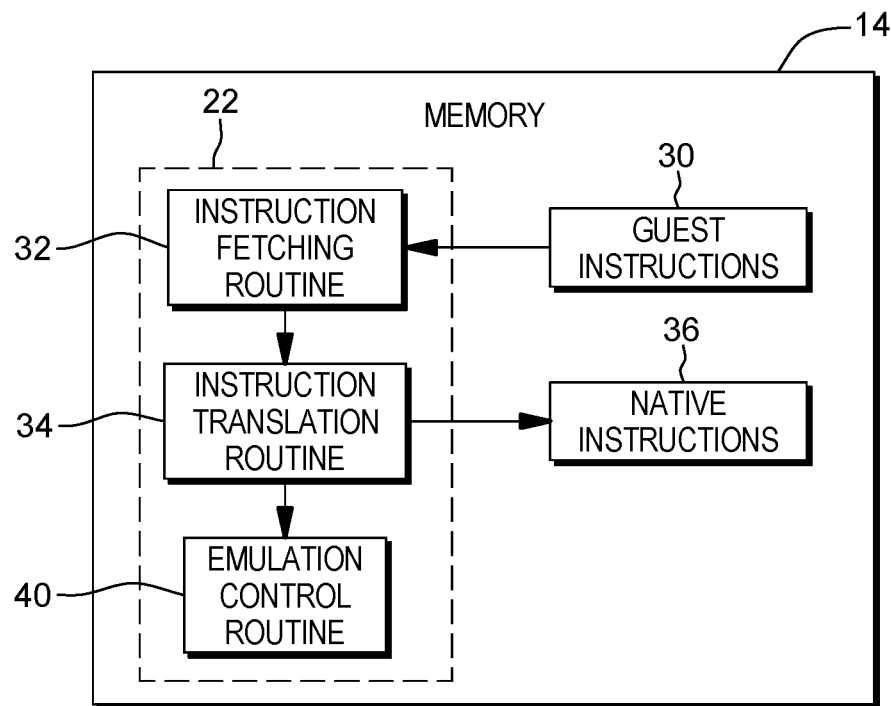
FIG. 6B depicts further details of the memory of FIG. 6A, in accordance with one or more aspects of the present invention.

Further details relating to emulator code 22 are described with reference to FIG. 6B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide overflow processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
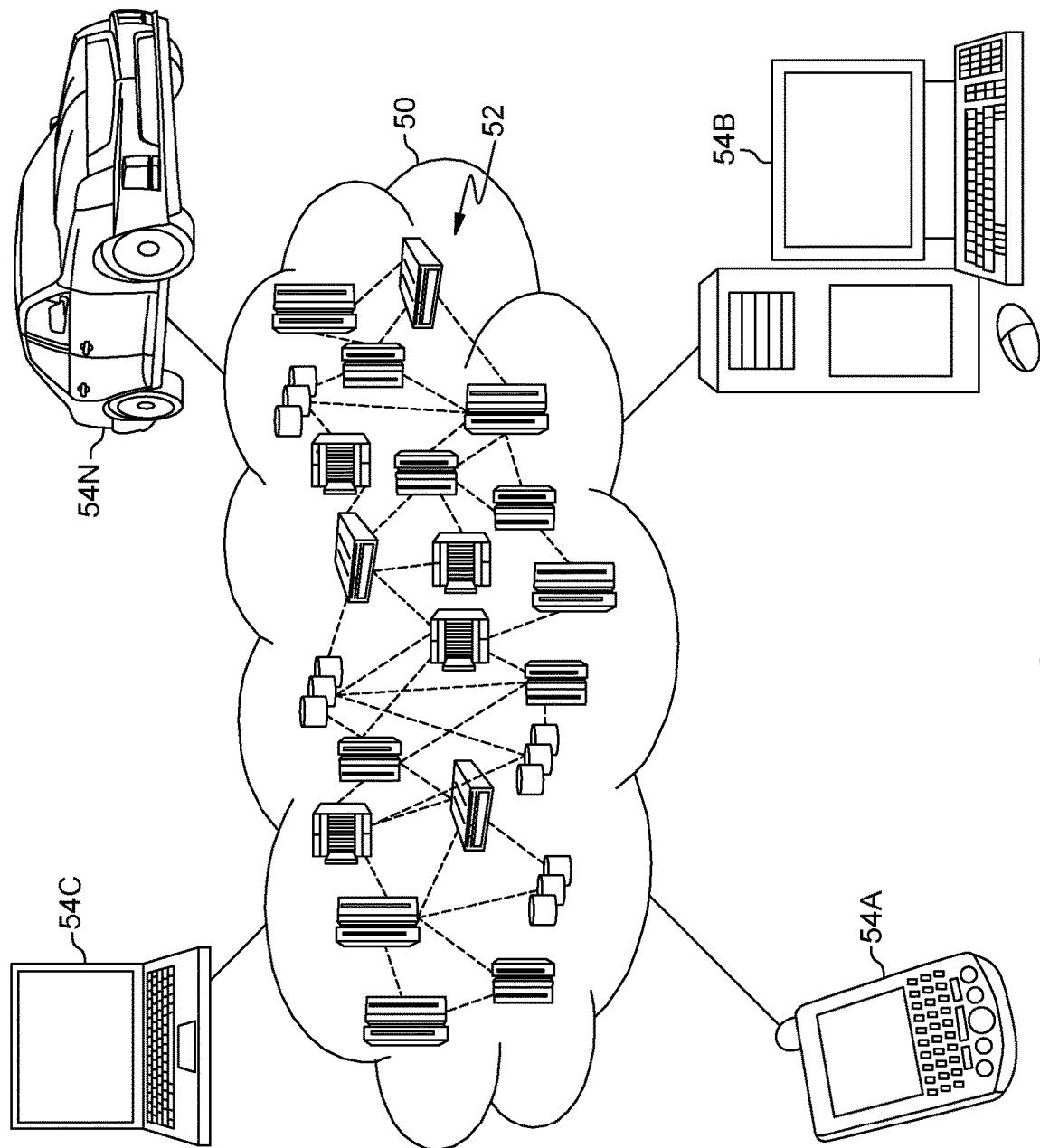
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
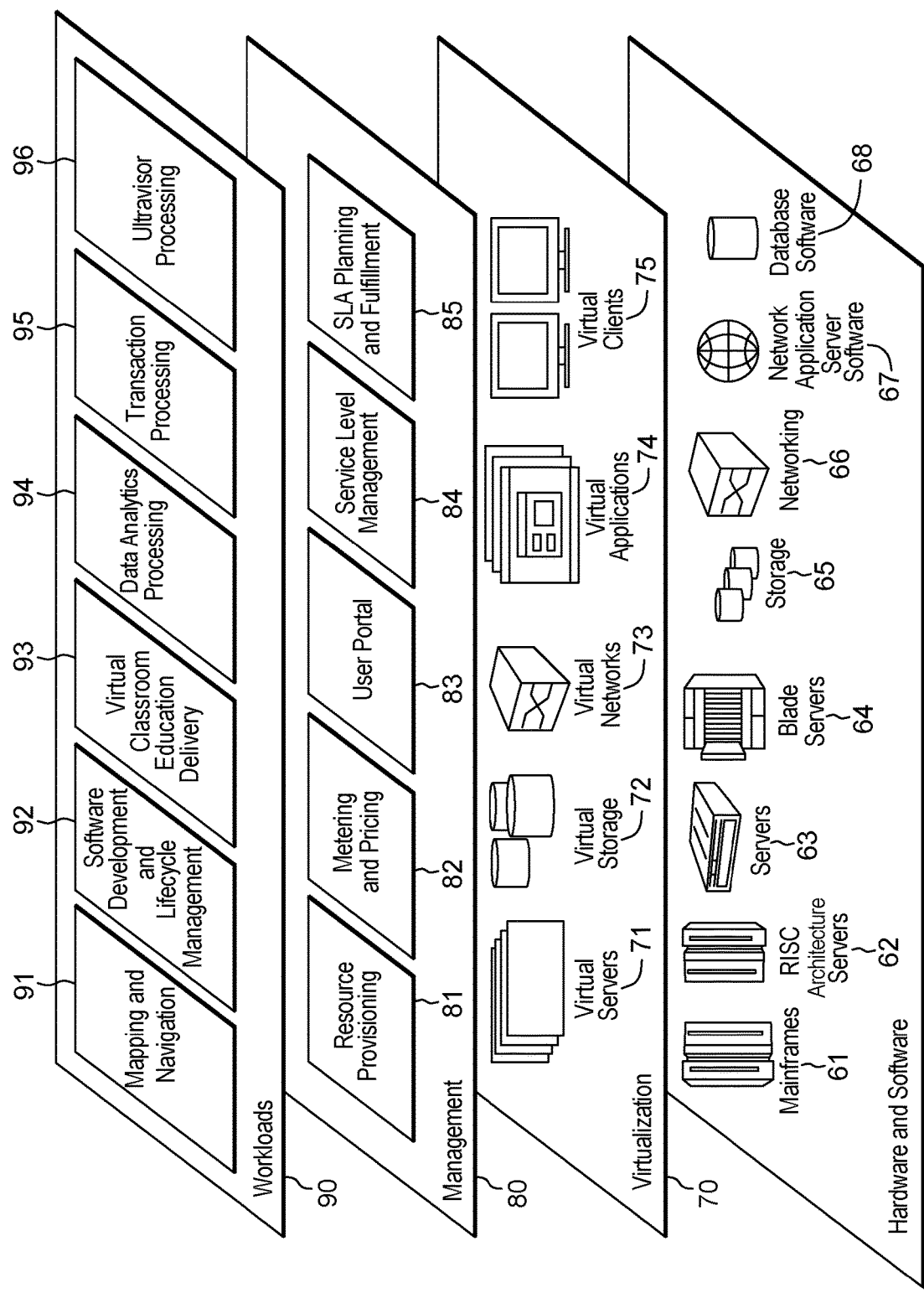
FIG. 8 depicts an example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure interface control (ultravisor) processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different types of indicators may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system to facilitate secure processing within a computing environment, the computer system comprising:
   a memory;
   a processor coupled to the memory, wherein the computer system is configured to perform a method comprising:
      incrementally decrypting a secure operating system image, including for a page of a plurality of pages of the secure operating system image:
         receiving a page address of the page and a tweak value used during encryption of the page;
         determining that the tweak value has not previously been used during decryption of another page of the plurality of pages of the secure operating system image; and
         decrypting memory page content at the page address using an image encryption key used in encrypting the page and the tweak value to facilitate obtaining a decrypted secure operating system image;
      receiving an integrity content hash of secure operating system image content and an integrity address hash of secure operating system image addresses;
      verifying integrity of the secure operating system image, the verifying integrity of the secure operating system image including comparing a cumulative content hash obtained using memory page content of the plurality of pages to the received integrity content hash and comparing a cumulative address hash obtained using page addresses of the plurality of pages to the received integrity address hash; and
      based on verifying integrity of the secure operating system image, starting execution of the decrypted secure operating system image.

2. The computer system of claim 1, wherein the incrementally decrypting and the verifying integrity are performed by a secure interface control of the computer system, the secure interface control being a trusted entity of the computer system, and the page address and the tweak value are received by the secure interface control from a hypervisor.

3. The computer system of claim 2, wherein page addresses of the plurality of pages are in a fixed order, and the incrementally decrypting the secure operating system image includes determining that the page address is different than any previous page address of previously decrypted pages of the plurality of pages of the secure operating system image.

4. The computer system of claim 3, wherein the incrementally decrypting the secure operating system image further includes determining that the tweak value is different than previous tweak values used during decryption of previously decrypted pages of the plurality of pages of the secure operating system image.

5. The computer system of claim 2, further comprising extracting, by the secure interface control, the image encryption key and the integrity content hash and integrity address hash from metadata received from the hypervisor.

6. The computer system of claim 2, wherein the secure interface control comprises one or more elements of the computer system, the one or more elements being selected from a group consisting of hardware elements and firmware elements, and the secure operating system image is to be run as a secure guest operating system within the computing environment.

7. The computer system of claim 6, wherein a private-public key pair is associated with the computer system, the private key being known only to the secure interface control, and not accessible by software running on the computer system, and wherein the public key is used by an owner of the secure operating system image to generate key agreement data to securely communicate the image encryption key used for encrypting the secure operating system image with the secure interface control and store the key agreement data in a metadata structure.

8. The computer system of claim 7, further comprising receiving by the secure interface control the metadata structure with a call from the hypervisor, the metadata structure further comprising integrity hash values used in the verifying integrity of the secure operating system image.

9. A computer program product comprising:
   a computer-readable storage medium readable by a processing circuit and storing instructions for performing a method comprising:
      incrementally decrypting a secure operating system image, including for a page of a plurality of pages of the secure operating system image:
         receiving a page address of the page and a tweak value used during encryption of the page;
         determining that the tweak value has not previously been used during decryption of another page of the plurality of pages of the secure operating system image; and
         decrypting memory page content at the page address using an image encryption key used in encrypting the page and the tweak value to facilitate obtaining a decrypted secure operating system image;
receiving an integrity content hash of secure operating system image content and an integrity address hash of secure operating system image addresses;
verifying integrity of the secure operating system image, the verifying integrity of the secure operating system image including comparing a cumulative content hash obtained using memory page content of the plurality of pages to the received integrity content hash and comparing a cumulative address hash obtained using page addresses of the plurality of pages to the received integrity address hash; and
based on verifying integrity of the secure operating system image, starting execution of the decrypted secure operating system image.

10. The computer program product of claim 9, wherein page addresses of the plurality of pages are in a fixed order, and the incrementally decrypting the secure operating system image includes determining that the page address is different than any previous page address of previously decrypted pages of the plurality of pages of the secure operating system image.

11. The computer program product of claim 10, wherein the incrementally decrypting the secure operating system image further includes determining that the tweak value is different than any previous tweak values used during decryption of previously decrypted pages of the plurality of pages of the secure operating system image.

12. The computer program product of claim 9, further comprising extracting the image encryption key and the integrity content hash and integrity address hash from metadata received from a hypervisor.

13. A computer-implemented method comprising:
incrementally decrypting a secure operating system image, including for a page of a plurality of pages of the secure operating system image:
  receiving a page address of the page and a tweak value used during encryption of the page;
  determining that the tweak value has not previously been used during decryption of another page of the plurality of pages of the secure operating system image; and
  decrypting memory page content at the page address using an image encryption key used in encrypting the page and the tweak value to facilitate obtaining a decrypted secure operating system image;
receiving an integrity content hash of secure operating system image content and an integrity address hash of secure operating system image addresses;
verifying integrity of the secure operating system image, the verifying integrity of the secure operating system image including comparing a cumulative content hash obtained using memory page content of the plurality of pages to the received integrity content hash and comparing a cumulative address hash obtained using page addresses of the plurality of pages to the received integrity address hash; and
based on verifying integrity of the secure operating system image, starting execution of the decrypted secure operating system image.

14. The computer-implemented method of claim 13, wherein the incrementally decrypting and the verifying integrity are performed by a secure interface control of a host computer system, the secure interface control being a trusted entity, and the page address and the tweak value used are received by the secure interface control from a hypervisor.

15. The computer-implemented method of claim 14, wherein page addresses of the plurality of pages are in a fixed order, and the incrementally decrypting the secure operating system image includes determining that the page address is different than any previous page address of previously decrypted pages of the plurality of pages of the secure operating system image, and wherein the incrementally decrypting the secure operating system image further includes determining that the tweak value is different than any previous tweak values used during decryption of previously decrypted pages of the plurality of pages of the secure operating system image.

* * * * *